Feb. 2, 1971 R. L. NEILSON 3,559,405
SELF-BLEEDING, SELF-CIRCULATING BRAKING SYSTEM
Filed March 20, 1969 2 Sheets-Sheet 1

INVENTOR.
ROGER L. NEILSON
BY
Auslander & Thomas
ATTORNEYS

INVENTOR.
ROGER L. NEILSON
BY
Auslander & Thomas
ATTORNEYS

United States Patent Office 3,559,405
Patented Feb. 2, 1971

3,559,405
SELF-BLEEDING, SELF-CIRCULATING
BRAKING SYSTEM
Roger L. Neilson, 70 Trafalgar Drive,
Shirley, N.Y. 11967
Filed Mar. 20, 1969, Ser. No. 808,731
Int. Cl. B60t 11/10; F15b 7/00
U.S. Cl. 60—54.5                                8 Claims

ABSTRACT OF THE DISCLOSURE

The present invention provides for hydraulic braking systems, which generally include a master cylinder and a plurality of conduits which extend from the master cylinder to hydraulically operable braking mechanisms and a return line communicating with the conduits at each braking mechanism for return flow back to the master cylinder. The return lines are of a lesser diameter than the conduits and preferably include an adjustable valve arrangement at the master cylinder inlet for each such line which allows a continual flow path, adjustable as to rate, between each line and the master cylinder.

---

The present invention relates to braking systems and more particularly to a self-bleeding, self-circulating braking system.

The most commonly employed braking system such as those used for motor vehicles today generally provides a fluid system including a master cylinder and a plurality of conduits running therefrom to the braking mechanism located on the wheels of the vehicle. There is usually provided either one conduit for each wheel or a single conduit with separate branches for selected pairs of wheels. Upon the mechanical actuation of a piston or pistons within the master cylinder, such as through the exertion of a force on the brake pedal of the vehicle, a pressure is created within the master cylinder and the conduits and the hydraulic fluid actuates the braking mechanism.

The most common service problem encountered in such systems is the replacement of hydraulic fluid lost through heat dissipation or to remove air or other undesired materials within the master cylinder or brake lines. Thus, at present most braking systems require periodic "bleeding" and/or the replacement or addition of fluid into the system.

Additionally, the heat buildup which occurs in the fluid has a tendency to cause wear of the brake conduit structure oftentimes requiring the replacement of worn conduits.

According to the present invention there is provided a self-bleeding, self-circulating system integral to the braking system allowing for a return flow from the braking mechanism at the wheels back to the master cylinder so as to have a closed complete circuit while still allowing sufficient fluid pressure for brake actuation.

While in the past some attempts have been made to provide for a return flow to the master cylinder, such systems were not self-actuating nor continuously operative, but rather required relatively complex supplementary actuating mechanisms requiring a desired user to actively actuate the system at desired intervals. In bleeding systems where no return flow is provided the bleeding operation generally requires the skills of one and generally two artisans with their attendant service fees.

The present invention provides a continuous circulation and bleeding through the provision of return conduits or lines preferably of a narrower diameter than the main brake lines, from each wheel back to the master cylinder with the re-entry rate or circulatory flow regulated by a fixed adjustable valve arrangement.

While the rate of circulation is relatively slow during normal use of the brakes the valve arrangement of the present invention allows for adjustment for variation in the rate of circulation so that a more rapid flushing of the braking system can be accomplished, if desired.

The circulation through the valve arrangement of the present invention further acts as a safety valve to relieve the system of some of the heat built up during application of the brakes. The reduction in heat additionally inhibits evaporation or gas bubble formation within the system.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Due to its predominant use in motor vehicles the system of the present invention has been shown and described with respect to motor vehicles. It is appreciated, however that the system can be readily employed in other hydraulic systems.

Figure 1:
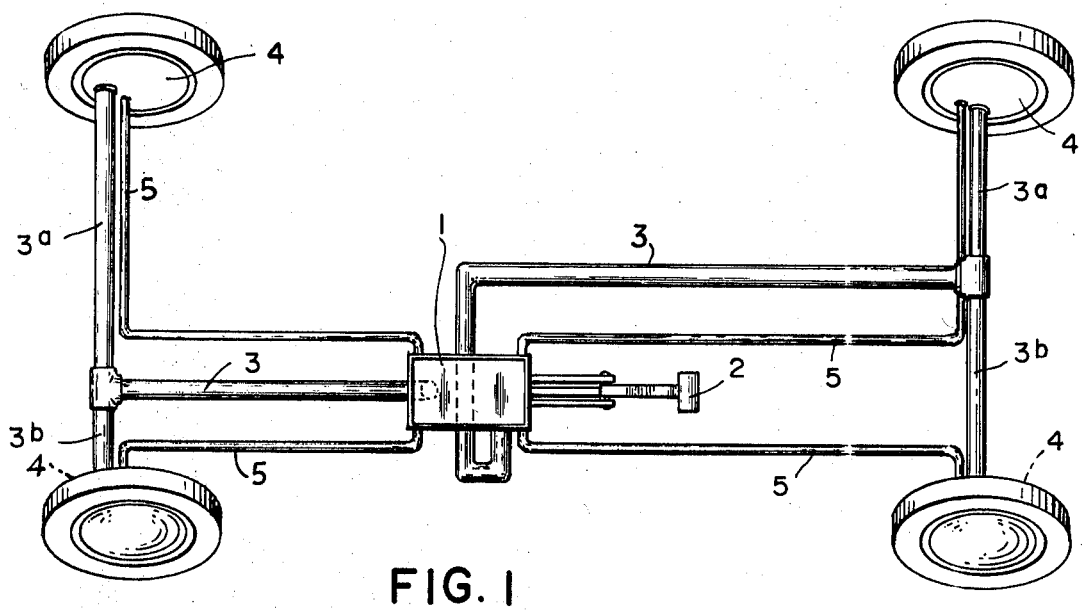
FIG. 1 is a schematic view of a braking arrangement of the present invention.

As shown in FIG. 1 the master cylinder 1 is operably linked to the brake pedal 2 of a motor vehicle. As is known in the art the brake pedal 2 operates a master piston (not shown). Conduits 3 run from the master cylinder 1 to the wheel cylinders 4 schematically illustrated. These conduits 3 are similar to those found in conventional braking systems with each conduit 3 having branches 3a, 3b allowing for one conduit to feed two braking mechanisms. Of course, if desired, a separate conduit could be provided for each wheel.

A bleeder line 5 from each wheel cylinder 4 is provided. Each bleeder line 5 communicates with one of the distal ends of the conduit branches 3a, 3b for fluid flow therebetween. The bleeder lines 5 are of a narrower diameter than the conduits 3 or conduit branches 3a, 3b. Each bleeder line 5 terminates at the master cylinder 1 so as to complete the fluid circuit from the master cylinder 1 to the wheel cylinders 4 and thence back to the master cylinder 1.

Figure 2:
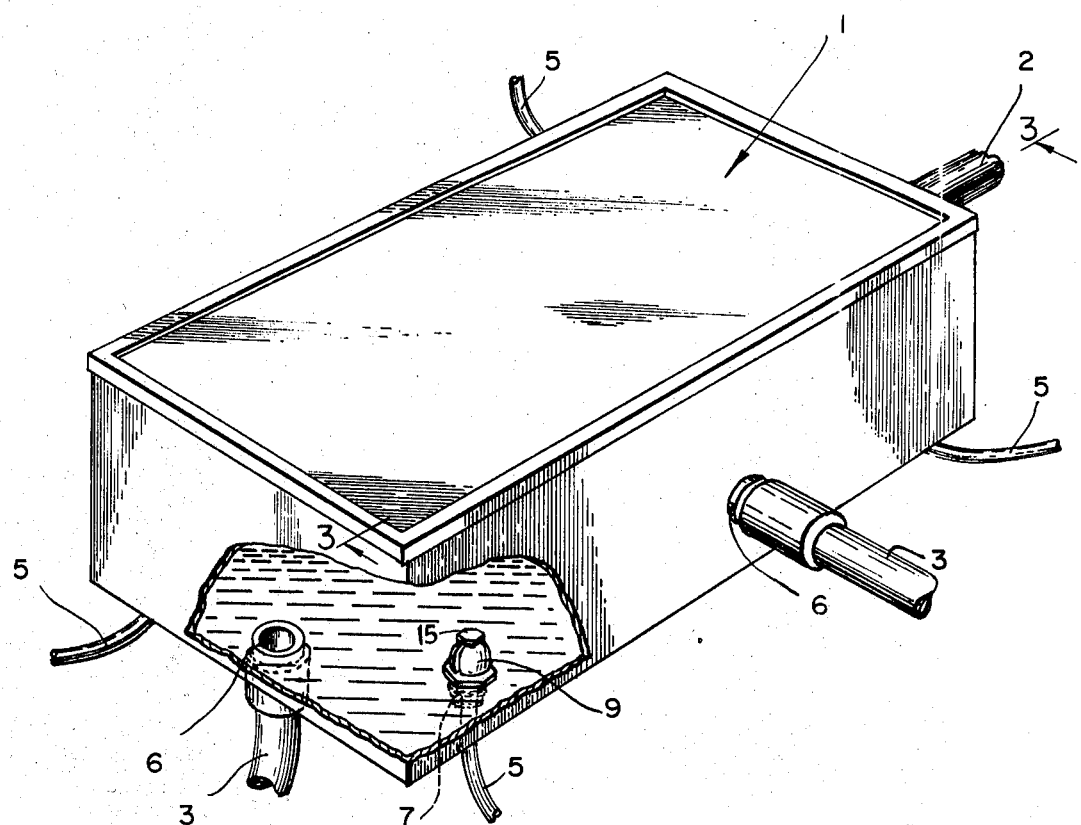
FIG. 2 is a perspective view partly in section of a master cylinder constructed in accordance with the present invention.
Figure 3:
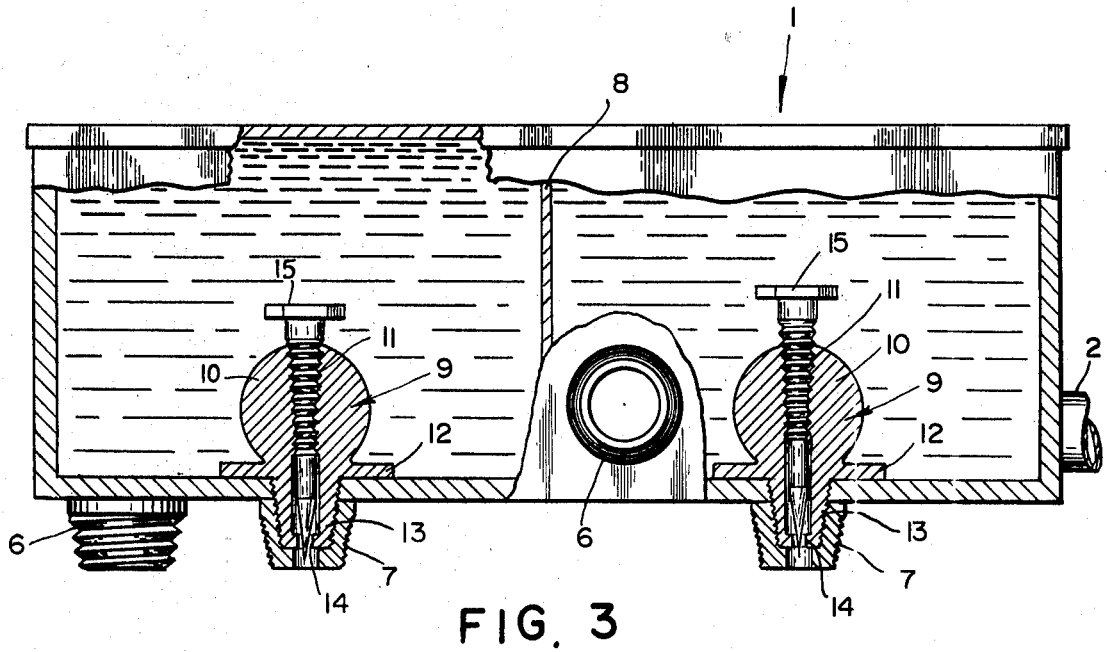
FIG. 3 is a sectional view taken along lines 3—3 of FIG. 2 with the conduits and bleeder lines omitted for clarity.

FIGS. 2 and 3 illustrate the terminal affixation of the conduits 3 and bleeder lines 5 in the master cylinder 1. The basic configuration of the master cylinder 1 is optional and various other master cylinder designs can be readily employed. The conduits 3 are mounted to outlet ports 6 and the bleeder lines 5 are mounted to inlet ports 7 provided in the master cylinder 1. Thus the master cylinder 1 illustrated includes two outlet ports 6 and four lesser diameter inlet ports 7. The ports 6, 7 generally include a fitting portion for the clamping of the conduits 3 or bleeder lines thereto.

The master cylinder 1 may be compartmentalized in a manner known in the art with each outlet port 6 in its own chamber with the chambers separated by use of a dividing wall 8 or the like.

Figure 4:
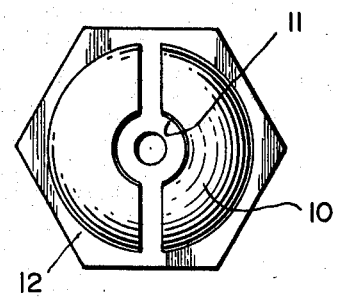
FIG. 4 is a top elevation of the needle valve seating structure of the present invention.
Figure 5:
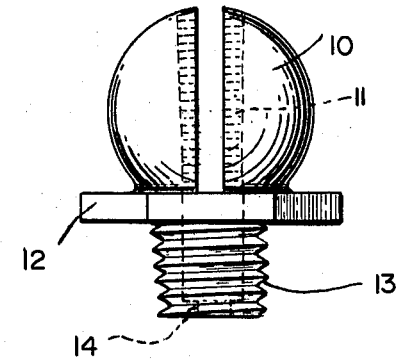
FIG. 5 is a side elevation of the seating structure of FIG. 4.

Seated into the mouth of each inlet port 7 is an adjustable valve arrangement 9 of the present invention. As illustrated most clearly in FIGS. 3-5 the valve arrangement 9 generally includes a split dome 10 having a central vertically tapered threaded portion 11; a base flange 12 having a central opening therethrough underlying the dome 10; and a hollow inlet port insert portion 13.

For mounting within the inlet port 7 fitting the inlet port insert portion 13 is preferably threaded to mate fit threads provided on the inner periphery of the inlet port 7 fitting. Both the inlet port 7 fitting and the inlet port insert 13 may be tapered to provide a tighter joining and the base flange 12 of the valve arrangement 9 may have a peripheral hexagonal design to aid in screw emplacement of the valve arrangement 9.

A threaded tapered needle valve 15 is seated within the valve arrangement 9 by screw setting the needle valve 15 into the central threaded portion 11 of the split dome 10 with the tapered end of the needle valve extending vertically into the inlet port insert 13. An inner flange 14 on the inlet port insert 13 provides a seat for the needle valve end 15, however a minor clearance between the periphery of the needle valve 15 and the inner flange 14 remains so as to allow fluid flow.

As illustrated in FIG. 3 the depth of seating of the needle valve 15 can be varied depending upon the rate of flow desired with the needle valve 15 on the left seated for minimal flow and the needle valve 15 on the right seated for a greater flow. Even in fully seated position such as illustrated in the left hand side of FIG. 3, a minor clearance is present allowing the passage of hydraulic fluid therethrough.

To allow fluid movement the diameter of the lower section of the needle valve 15 is less than the diameter of the inner diameter of the inlet port insert portion 13 and the opening in the base flange 12. In the setting of the needle valve 15 to provide minimal flow the wider diameter threaded portion of the needle valve 15 terminates at a point between the split dome 10.

The tapered upper portion of needle valve 15 is preferably slightly wider than the central threaded portion 11 of the split dome 10. Thus, when the needle valve 15 is inserted within the central threaded portion 11 the halves of the dome 10 will be forced slightly apart and the dome 10 will act in the nature of a vise and firmly retain the needle valve 15 and lock the needle valve 15 in the selected position between the two sections of the dome 10.

Figure 6:
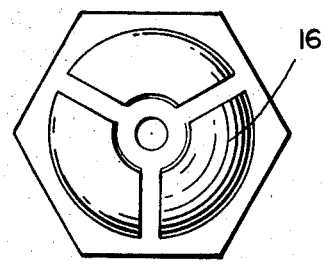
FIG. 6 is a top elevation of an alternate seating structure of the present invention.

While a circular split dome 10 has been illustrated various other configurations are possible. As shown in FIG. 6, the dome 16 may be slotted so as to be in three sections. In addition, if desired, the dome may be rectangular or of any other desired geometric configuration.

While the valve arrangement 9 of the present invention is desirable for selective metering of the return flow, the diameter differential with its concomitant pressure differential between the main conduits 3 and the bleeder lines 5 allows for the use of the system of the present invention without such valve arrangement 9. In such instance upon actuation of the brake pedal 2 a sufficient fluid pressure will still be exerted upon the wheel cylinders 4 to actuate the brakes.

The system of the present invention allows for a continuous open circuit and thus relieves the conduits 3 and brake lines 5 of the undesired effects which otherwise might occur due to heat build-up of the fluid within the lines and in such instance the apparatus of the present invention further acts in the nature of a safety valve. In addition, the continual displacement of the fluid during application and release of the brakes aids in keeping the fluid at desirable temperatures.

From the foregoing it can readily be appreciated that the type of master cylinder design which may be employed with the present invention and the number of conduits or bleeder lines can be varied depending upon the specific needs of a user. What has been shown and described in preferred form is the basic implementation of a self-bleeding, self-circulating system integral to a braking system wherein conduits of a wider diameter provide outlet flow and those of a narrower diameter inlet flow from a master cylinder with the inlet flow preferably regulated by an adjustable valve arrangement.

Having thus described certain forms of the invention in some detail, what is claimed is:

1. An apparatus for self-circulation of a fluid within a hydraulic braking system comprising a fluid carrying circuit including a master cylinder having at least one conduit extending therefrom to a hydraulically actuatable braking mechanism; at least one fluid line of a lesser diameter than said conduit communicating with said conduit for fluid flow therebetween at said braking mechanism; valve means within said master cylinder adapted to meter the flow of hydraulic fluid between said fluid line and said master cylinder; said valve means includes a needle valve and needle valve mounting means; said needle valve in seated position adapted to allow a predetermined passage of fluid between said fluid line and said master cylinder; said fluid line terminating at and communicating with said master cylinder; and means in said master cylinder to exert a pressure on said fluid to actuate said braking mechanism.

2. The apparatus as claimed in claim 1 wherein said needle valve is adjustable to selected set positions in said needle valve mounting means.

3. The apparatus as claimed in claim 1 wherein said master cylinder includes a hollow fitting adapted to mount the end of said fluid line and said needle valve mounting means includes; a hollow first member adapted to internally mate said fitting and a dome member vertically disposed to said first member having at least one transverse slot laterally dividing said dome and a substantially centralized needle valve retention portion between the portions of said divided dome for the vertical emplacement of said needle valve therein.

4. The apparatus as claimed in claim 3 wherein said first member includes an inward peripheral flange adapted to act as a valve seating for the end of said needle valve.

5. The apparatus as claimed in claim 3 wherein said needle valve and said needle valve retention portion are tapered.

6. The apparatus as claimed in claim 3 wherein a portion of said needle valve has a slightly greater diameter than the diameter of said needle retention portion and a portion of said needle valve has a smaller diameter than the diameter of said first member of said needle valve mounting means.

7. The apparatus as claimed in claim 3 wherein said dome includes a plurality of transverse slots.

8. The apparatus as claimed in claim 1 including a plurality of hydraulically actuatable braking mechanisms and at least one fluid line extending from each said braking mechanism to said master cylinder.

References Cited
UNITED STATES PATENTS

| | | | |
|---|---|---|---|
| 1,985,812 | 12/1934 | Banas | 188—152.14X |
| 2,255,676 | 9/1941 | O'Reilly | 188—152.14 |
| 2,502,050 | 3/1950 | Kattner | 188—152.14X |
| 2,524,544 | 10/1950 | Seawell | 60—54.5 |

MARTIN P. SCHWADRON, Primary Examiner

R. BUNEVICH, Assistant Examiner

U.S. Cl. X.R.

188—152